May 6, 1952 J. MARCOU 2,595,399
TANKING PLANT

Filed March 30, 1948 2 SHEETS—SHEET 1

Inventor
Jean Marcou
by Sommers & Young
Attorneys

May 6, 1952 J. MARCOU 2,595,399
TANKING PLANT
Filed March 30, 1948 2 SHEETS—SHEET 2

Inventor
Jean Marcou
by Sommers & Young
Attorneys

Patented May 6, 1952

2,595,399

UNITED STATES PATENT OFFICE 2,595,399

TANKING PLANT

Jean Marcou, Paris, France, assignor to Societe Anonyme Tecalemit, Paris, France Application March 30, 1948, Serial No. 17,902
In France April 8, 1947

4 Claims. (Cl. 137—68)

This invention relates to a tanking plant, that is a plant designed to pump over liquids by large amounts.

The purpose of the invention is to simplify the filling of a group of tanks certain parts of which are not easily accessible, e. g. aircraft tanks, by relieving the attendants from the necessity of accomplishing often risky bodily performances.

The plant comprises:

1. A plurality of tanks to be filled, each of which is equipped with a system composed of a composite valve with a stop valve therein, an ejector and a pilot pipe connecting the former with the latter.

2. A central control station common to all the tanks to be filled, which comprises a manifold connected by a main pipe with the delivery of the pump and by branch pipes with the respective composite valves of the system.

3. At the central station, a meter in each branch pipe to measure the amount of liquid forced into the tank concerned.

4. At the central station, tell-tale devices to indicate whether liquid is being fed into the respective tanks.

5. In each pilot pile, a device responsive to the pressure of the liquid in said pipe and adapted to actuate the related tell-tale device at the central station.

In a plant according to this invention the pumping operation is controlled from a central station at which tell-tale devices are provided which are responsive to the pressures prevailing in the related pilot pipes during the tanking operation. As long as pressure is present in the pilot pipe concerned the related tell-tale device is kept in its "on" position, and same is switched to its "off" position as soon as the flow of liquid into the related tank has been stopped, in response to the action of the related ejector, upon the liquid in the related tank reaching the desired level.

Each system in the plant comprises the following elements:

(a) A stop valve controlled by a vacuum set up in a diaphragm chamber upon a predetermined level being reached in the tank filled, which stop valve may be located anywhere with respect to the tank to be filled.

(b) An ejector comprising a nozzle and an outlet cone, which is affixed to the tank at that level up to which same is to be filled.

(c) A vacuum pipe connecting the diaphragm chamber with a point between the nozzle and the cone of the ejector, through which pipe vacuum is applied to one side of the diaphragm upon the liquid in the tank reaching a predetermined level.

(d) A pilot pipe connecting the composite valve with the ejector nozzle and through which part of the liquid pumped over is led into the cone.

(e) Connecting means between the tank to be filled and the space at the other side of the diaphragm for the purpose of equalizing the pressures at either side of said diaphragm.

(f) Means to allow the liquid pumped to ascend in the vacuum pipe in proportion as its level rises in the tank.

(g) Means connected with the pilot pipe to allow the pressure prevailing in said pipe to act upon a device for the remote control of a signal.

A better understanding of the invention will be had from the following description of one embodiment of the same, in which reference is had to the appended drawings in which.

Figure 1:
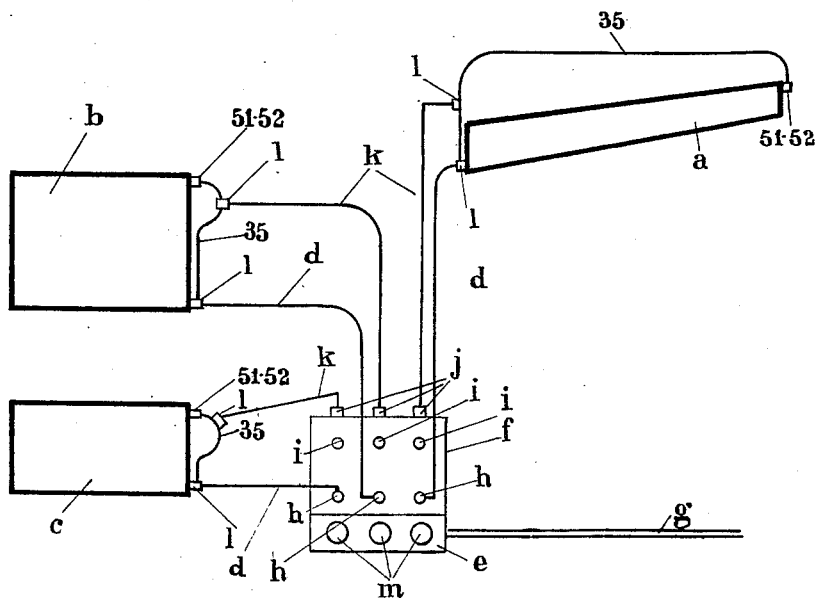
Figure 1 is a diagram illustrative of a plant designed for the filling of a set of three tanks.

As diagrammatically shown in Fig. 1 the plant is designed for the filling of a set of tanks carried by a flying boat, *a* designating a tank arranged in the wing and *b*, *c* designating tanks enclosed in the hull of the flying boat.

Each of said tanks *a*, *b*, *c* is equipped with the aforesaid system. Affixed too each tank at any suitable place is the composite valve *l* which comprises the stop valve 2; the ejector 51—52 is secured to the tank wall at the level to be reached by the fuel in said tank. Each composite valve *l* is connected with the related ejector 51—52 by a pilot pipe 35 through which only part of the flow is shunted. The bulk of the flow is led directly into the tanks through the composite valves *l* connected through branch pipes *d* with the manifold *e* located in the central station *f*. The manifold *e* is connected through the main pipe *g* with the delivery side of the tanking pump (not shown). Valves *m* may be provided in the manifold *e* to control the flow through the branch pipes *d*.

Provided in each branch pipe at the central station is a meter *h* designed to measure the amount of liquid pumped over into the related tank.

Tell-tale devices *i* are also provided at the central station by means of which the filling of each particular tank can conveniently be supervised.

The tell-tale devices $i$ are controlled electrically through relays $j$ provided in the lines $k$ and responsive to the pressure prevailing during the pumping operation in the pilot pipes 35, each of which pipes is connected through a union $l$ with means adapted, in dependency on the pressure of the liquid, to close a circuit and which may be of any known type, said means remaining without the scope of the invention.

Figure 2:
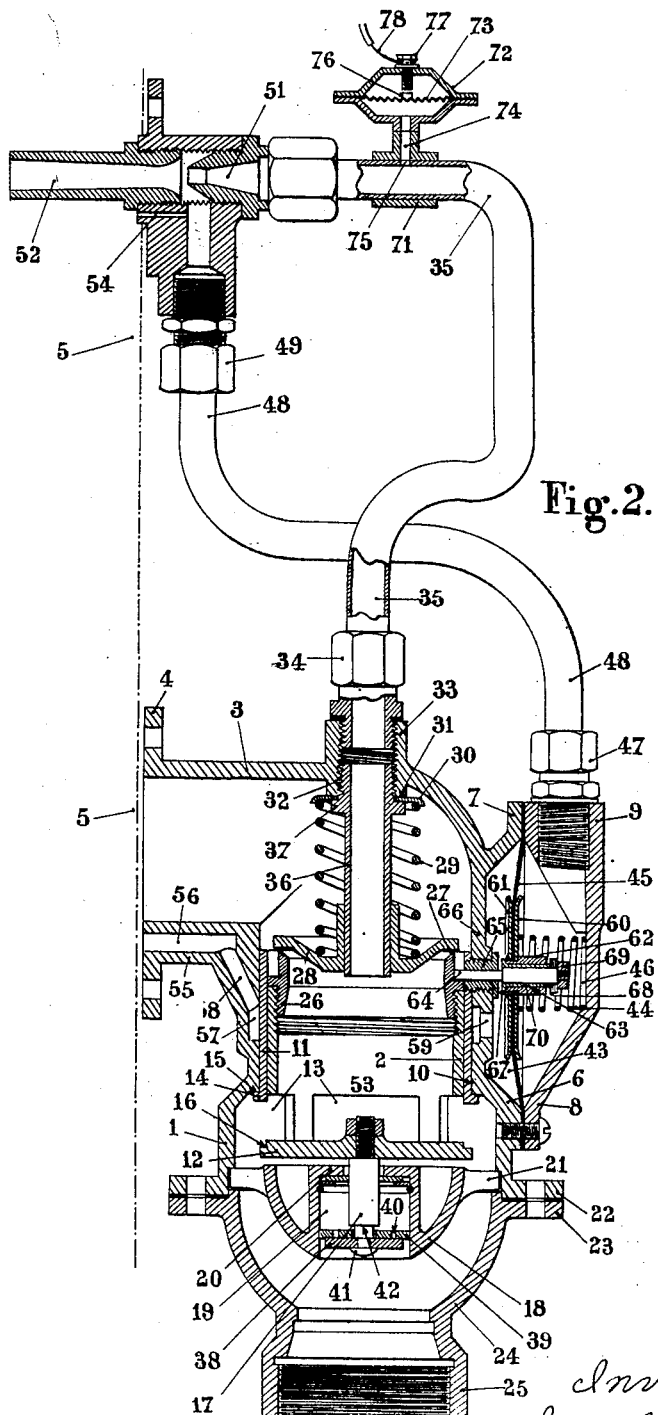
Figure 2 is a sectional view of a tank equipped according to the invention, the composite valve being affixed to an accessible part of the tank while the valve-actuating ejector is secured to the topmost portion of the tank at the level to be established therein.

Referring now to Fig. 2 of the appended drawing, which illustrates one of the systems composing the plant according to the invention, the cast valve-casing 1 which contains the stop valve 2 is formed with an elbow 3 provided with a flange 4 by means of which the composite valve can be secured to the tank 5 to be filled. Formed in the opposite side of the casing 1 is a cup-like projection 6 provided wtih a flange 7 on which a similar cup-like cover 8 is secured which is formed with an internally threaded tubular boss 9 designed to receive a connecting pipe.

A sleeve 11 is made a drive fit in the suitably bored restricted portion 10 of the casing 1; slidably received in said sleeve is the stop valve 2 which is formed with a solid bottom, ports 13 being provided in its skirt portion through which the liquid pumped over can flow on as long as said valve 2 is kept in its open position.

The sleeve 11 is formed with a flange 14 which rests on a shoulder 15 of the casing 1 while the bottom 12 of the valve is formed with a flange 16 which fits the flange 14 of the sleeve 11 in the closed position of the valve.

Secured centrally to the under side of valve 2 is a stud 17 slidably received in a cup-like member 18 formed with an inner coaxial cylinder 19 which in turn is formed at the top thereof with a wall 20 drilled with an axial hole designed to guide the aforesaid stud 17 in the course of the displacements of a device intended to cushion water-hammering effects as will be described later on.

The member 18 is provided with retaining lugs 21 enclosed between the flange 22 of casing 1 and a flange 23 on a main pipe union 24. Said lugs are so dimensioned that they will not interfere with the flow of liquid.

Rigid with the valve 2 is an upward tubular extension 26 the upper edge of which is bevelled to provide a seat for a non-return valve 28 loaded by a spring 29 rested with the interposition of a washer 30 on an inwardly projecting hub 32 of the casing 1, the outwardly projecting portion 33 of said hub being designed for connection with a union 34 at the end of the pilot pipe 35.

The non-return valve 28 is guided on a tube 36 screwed in casing 1 and is formed with a shoulder 37 by which the washer 30 is held in position.

The device for cushioning the water-hammering effect comprises a piston movable within the chamber 19. The piston is composed of an outer disc 38 slightly smaller in diameter than the bore of the chamber 19 and of an inner disc 39 drilled with a series of holes 40. The outer disc 38 rests at 41 on the end of stud 17. Ring 39 is loosely mounted between the ring 38 and a shoulder 42 on stud 17.

The space between the cup-like side extension 6 and the companion cover 8 provides a chamber divided into two compartments 43, 44 by a diaphragm 45 urged towards the inside by a spring 46.

The boss 9 is suitably machined to receive a union 47 from which the vacuum pipe 48 leads to a union 49 screwed in the ejector located at the topmost portion of the tank to be filled.

Said level-limiting ejector is located at the level to be attained in the tank and comprises a nozzle 51 and a cone 52, and will become operative as soon as the cone is flooded.

The nozzle 51 is connected permanently through the pilot pipe 35 with the liquid chamber 53 provided above the seat 16 of the stop valve 2, and a duct 54 sets the atmosphere of the tank into communication with the compartment 44 of the diaphragm chamber to prevent the undesirable creation of a vacuum therein.

In order to equalize the pressures at either side of the diaphragm 45 a boss 55 is cast with the casing 1 in which boss hole 56 is drilled through which the tank communicates with a ring channel 57 which in turn communicates through an orifice 59 with the compartment 43 of the diaphragm chamber. As a result of this novel arrangement, any increase in the pressure prevailing within the tank, which becomes effective in compartment 44 through the vacuum pipe 48, will also be effective in compartment 43. In this manner, the only resistance to be overcome when the diaphragm is snapped to the right by the action of the vacuum created by the ejector 51—52 upon the desired lever being attained in the tank is that of spring 46.

The pressure created by the liquid head in the tank is prevented from untimely releasing the stop valve 2 in the event it should become higher than the force exerted by the loading spring 46 acting upon the diaphragm in the following manner:

The diaphragm 45 is clamped between a pair of central discs 60, 61 carried by a hub 62 slidably mounted with a slight axial play on the cylindrical shaft 63 of a latch 64.

Said latch 64 keeps the stop valve 2 in its open position during the tanking operation and is guided in a bushing 65 screwed in the wall 66 of casing 1.

Said latch is formed with a shoulder 67 designed to limit its displacement towards the inside of the casing and carries at its outer end a packing ring 68 clamped thereon with the aid of a nut 69 screwed on the slant outer end of said latch, by which nut it is pressed against the end face of said shaft.

Milled in the shaft 63 are a plurality of grooves 70 through which the liquid in compartment 43 can flow over into compartment 44 at the other side of the diaphragm 45.

With the hub 62 of diaphragm 45 in the position shown, i. e. as long as an axial play exists between the outer face of the hub and the packing ring 68, the liquid can flow through the ends of the grooves 70 from compartment 43 into compartment 45 of the diaphragm chamber.

The result of this is that during the tanking operation the level of liquid will rise simultaneously in the tank 5 and the vacuum pipe 48.

The tell-tale device comprises a diaphragm chamber 72 enclosing a diaphragm 73 one side of which communicates through a T-union with a port 75 in the pilot pipe 35.

On its opposite side the diaphragm 75 carries a contact stud 76 adapted to engage a fixed contact stud 77 carried by the diaphragm chamber housing 72 and connected through a lead 78 with a relay (not shown in Fig. 2) visible at $j$ in Fig. 1.

With the several elements of the system in the position shown in Fig. 2, which is the "set" position, the operation is as follows:

The liquid that flows through the main supply pipe (not shown) into the composite valve screwed thereon with its threaded portion 25 enters the liquid chamber 53 above the bottom 12 of the stop valve 2 past the retaining lugs 21 of the cup-like member 18.

As long as the liquid pressure is insufficient to lift the non-return valve 28 against the action of spring 29 the liquid will flow into tank 5 through pilot pipe 35, nozzle 51 and cone 52 of the ejector.

Upon the liquid pressure becoming sufficient to overcome the force of spring 29 and thereby to open the non-return valve 28 the liquid will also flow into tank 5 past said non-return valve 28.

For the time the tanking operation is going on the pressures at either side of the diaphragm are equalized through 56—58—57—59 on one hand and through pipe 48 on the other hand. This provides the new means stated in paragraph (e) of the preamble which means make it certain that the only resistance to be overcome when the sucking effect of the ejector 51—52 influences the diaphragm 45 upon the desired level being attained is the force of spring 46.

Upon the liquid reaching the level of duct 56 it will flow over through said duct 56 and the passageways 58—57—59 into compartment 43 of the diaphragm chamber and thence through the grooves 70 into the other chamber 44. Henceforth the liquid level will rise equally in the tank 5 and the vacuum pipe 48, so that with the aid of this arrangement equality in the pressures at either side of the diaphragm 45 is ensured irrespective of the level reached by the liquid in the tank. This does away with any risk of an untimely tripping of the valve latch which otherwise would occur upon the liquid head overcoming the force of spring 46.

As soon as liquid is pumped over the delivery pressure prevails in the pilot pipe 35 and becomes effective upon the diaphragm 73 in chamber 72 through the hole 75 and the passageway 74, with the result that due to the deformation of the diaphragm the stud 76 is lifted into engagement with stud 77, thus closing through lead 78 (also shown at k in Fig. 1) the circuit through which the related relay j designed to actuate the tell-tale device at the central station is energized.

In this manner the operator is informed that the tanking operation has actually begun and goes on normally.

Dealt with will now be what occurs upon the liquid in any tank reaching the level predetermined by the position of the ejector together with the duct 54 by which equality is maintained between the pressures in the tank and the compartment 44 of the diaphragm chamber and which is designed to preclude any undesired suction effect in said compartment in the event an air pocket should burst at the outlet of the ejector (which normally operates in non-wetted wall conditions for the purpose of precluding any formation of an emulsion). In fact, the duct 54 is located on one horizontal plane with the ejector.

Upon the ejector and the duct 54 becoming flooded, a depression is created abruptly which becomes effective in two steps.

In the first step the hub 62 rigid with diaphragm 45 comes into engagement with its right end with the packing ring 68, whereby the compartments 43 and 44 are cut off from each other.

In the second step the vacuum becomes fully effective, so that the latch 64 is snapped to the right as shown in the drawing through the medium of the packing ring 68, whereby the stop valve 2—26 is released.

The entire liquid pressure that acts upon the difference in the sections of the non-return valve and the stop valve in the slidable portion thereof (which is the larger) shifts said stop valve into closed position.

Thereupon the cushioning device 17—38—39—49 becomes effective to deaden the displacement of the valve since the liquid that entered the space 19 through the holes 49 during the pumping operation can only flow out slowly through the various leaks in the device.

The stop valve thus braked as desired in its movement comes then into engagement with its ring edge 16 with its seat 14 on the sleeve 11 so that no liquid can flow henceforth towards the tank.

As soon as the supply pressure is released the whole of the non-return valve 28 and the stop valve 2 is snapped by the spring 29 back into the position shown in Fig. 2, i. e. into its "set" condition.

As a result of the release of spring 46 the diaphragm is snapped towards the left as shown in the drawing and the latch 64 is returned to its valve-locking position; the composite valve is ready for a new tanking operation.

What I claim as my invention and desire to secure by Letters Patent is:

1. A device for automatically filling a tank up to a certain level of the vertical walls of such tank by means of an admission pipe-system of liquid under pressure comprising a body provided with a threaded opening connected with the admission pipe-system of liquid under pressure, an enlarged flanged opening fitted against a corresponding opening of a vertical wall of the tank, and a third opening with smaller diameter than the two previous holes, a pilot pipe mounted in the third opening of the body and rising towards the upper part of the tank, a nozzle mounted at the top end of this pilot pipe, a cone placed opposite the nozzle and entering in the vertical wall of the tank at a higher level than the level to which the flanged opening of the body emerges in the tank, a member enclosing the space included between the nozzle and the cone, a valve sliding in the body and whose position may either permit or stop the admission of the liquid under pressure towards the flanged opening of the body and towards the opening with the smallest diameter on which is mounted the pilot pipe, this valve being thrust by the pressure of the liquid coming from the threaded opening towards the closing position of this valve and means keeping the valve open during the filling of the tank and closing the valve under the action of the depression which forms in the space included between the nozzle and the cone when this space is flooded by the liquid filling the tank when the level of this liquid reaches the cone.

2. A device for automatically filling a tank up to a certain level of the vertical walls of such tank by means of an admission pipe-system of liquid under pressure comprising a body provided with a threaded opening connected with the admission pipe-system of liquid under pressure, an enlarged flanged opening fitted against a corresponding opening of a vertical wall of the tank, and a third opening with smaller diameter than the two previous holes, a pilot pipe mounted in the third opening of the body and rising towards the upper part of the tank, a nozzle mounted at the top end of this pilot pipe, a cone placed opposite the nozzle and entering in the vertical wall of the tank at a higher level than the level to which the flanged opening of the body emerges in the tank, a member enclosing the space included between the nozzle and the cone, a valve sliding in the body and whose position may either permit or stop the admission of the liquid under pressure towards the flanged opening of the body and towards the opening with the smallest diameter on which is mounted the pilot pipe, this valve being thrust by the pressure of the liquid coming from the threaded opening towards the closing position of this valve, the body comprising an extension constituting a side chamber, a diaphragm contained in this side chamber and dividing into two zones this side chamber, means embodying the balancing of the pressures in the two zones of the side chamber as well as the transmission to that of these two zones of the side chamber the furthest away from the body of the depression which forms in the space included between the nozzle and the cone when the level of the liquid in the tank reaches this cone as well as means keeping the valve open for the filling of the tank and closing this valve under the control of the diaphragm contained in the side chamber when this diaphragm is deformed by the depression which results in that of the two zones of the side chamber which is the furthest away from the body.

3. A device for automatically filling a tank up to a certain level of the vertical walls of such tank by means of an admission pipe-system of liquid under pressure comprising a body provided with a threaded opening connected with the admission pipe-system of liquid under pressure, an enlarged flanged opening fitted against a corresponding opening of a vertical wall of a tank, and a third opening with smaller diameter than the two previous holes, a pilot pipe mounted in the third opening of the body and rising towards the upper part of the tank, a nozzle mounted at the top end of this pilot pipe, a cone placed opposite the nozzle and entering a vertical wall of the tank at a higher level than the level to which the flanged opening of the body emerges in the tank, a member enclosing the space included between the nozzle and the cone, a valve sliding in the body and whose partition may either permit or stop the admission of the liquid under pressure towards the flanged opening of the body and towards the opening with the smallest diameter on which is mounted the pilot pipe, this valve being thrust by the pressure of the liquid coming from the threaded opening towards the closing position of this valve, the body comprising an extension constituting a side chamber, a diaphragm contained in this side chamber and dividing into two zones this side chamber, the body presenting an outer bulge in which a duct is hollowed which makes the inside of the tank connect up with that of the two zones of the side chamber which is the nearest to the body, a depression pipework connecting the side chamber which is the furthest away from the body with the member which encloses the space included between the nozzle and the cone, this member being bored with a first duct which makes this depression pipework connect with the nozzle and cone and being likewise bored with a small duct which makes said first duct connect with the inside of the tank and means maintaining the valve open for filling the tank and closing the valve under the control of the diaphragm contained in the side chamber when the diaphragm is deformed by the depression which is caused in that of the two zones of the side chamber which is the furthest away from the body.

4. A device for automatically filling a tank up to a certain level of the vertical walls of such tank by means of an admission pipe-system of liquid under pressure comprising a body provided with a threaded opening connected with the admission pipe system of liquid under pressure, an enlarged flanged opening fitted against a corresponding opening of a vertical wall of the tank, and a third opening with smaller diameter than the two previous holes, a pilot pipe mounted in the third opening of the body and rising towards the upper part of the tank, a nozzle mounted at the top end of this pilot pipe, a cone placed opposite the nozzle and entering in the vertical wall of the tank at a higher level than the flanged opening of the body emerges in the tank, a member enclosing the space included between the nozzle and the cone, a valve sliding in the body and whose position may either permit or stop the admission of the liquid under pressure towards the opening of the flange of the body and towards the opening with the smallest diameter on which is mounted the pilot pipe, this valve being thrust by the pressure of the liquid coming from the threaded opening towards the closing position of this valve, the body comprising an extension constituting a side chamber, a diaphragm contained in this side chamber and dividing into two regions this side chamber, the body presenting an outer bulge in which is hollowed a duct which makes the inside of the tank connect with that of the two zones of the side chamber which is the nearest to the body, a depression pipework connecting the side chamber which is the furthest away from the body with the member which encloses the space included between the nozzle and the cone, this member being bored with a first duct which makes this depression pipework connect with the nozzle and the cone and likewise being bored with a small duct which makes said first duct connect with the inside of the tank, a cylindrical member fixed to the center of the diaphragm contained in the side chamber of the body, this cylindrical member comprising an extension which slides in an opening of the wall of the body, this extension being arranged to lock the valve in its opening position when the pressures exerted on the two faces of the diaphragm are equal and to free this valve in thus carrying out its closing under the action of the pressure of the liquid contained in the admission pipe system of the liquid when the center of the diaphragm moves towards the outside of the body as a result of the deformation of this diaphragm caused by a depression in that of the two zones of the side chamber which is the furthest away from the body.

JEAN MARCOU.

REFERENCES CITED

The following references are of record in the file of this patent:

UNITED STATES PATENTS

| Number | Name | Date |
| --- | --- | --- |
| 971,934 | Siegrist | Oct. 4, 1910 |
| 2,340,070 | McCauley | Jan. 25, 1944 |
| 2,384,628 | Krone | Sept. 11, 1945 |